United States Patent Office 3,493,616
Patented Feb. 3, 1970

3,493,616
HYDROXY AND/OR HYDROCARBYLOXY AND
AMINO-ALKANO-TETRAHYDRONAPHTHALENES
Ted Symon, Lombard, Ill., assignor to Universal Oil
Products Company, Des Plaines, Ill., a corporation of
Delaware
No Drawing. Filed Feb. 27, 1967, Ser. No. 619,043
Int. Cl. C07c 91/40; C08f 45/60
U.S. Cl. 260—571
8 Claims

ABSTRACT OF THE DISCLOSURE 5,8-di-(hydroxy and/or hydrocarbyloxy)-6-amino-1,4-dialkano-1,2,3,4-tetrahydronaphthalene, and use as additive in organic substrates.

DESCRIPTION OF THE INVENTION

This invention relates to novel compounds comprising alkano-tetrahydronaphthalenes substituted by both hydroxy and/or hydrocarbyloxy and amino groups.

The novel compounds of the present invention are illustrated by the following formula

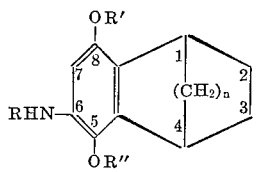

where R, R' and R'' are independently selected from hydrogen, alkyl, aralkyl, aryl, alkaryl or cycloalkyl and $n$ is 1 or 2.

Where $n$ in the above formula is 1, the compound is 5,8 - di - (hydroxy and/or hydrocarbyloxy) - 6 - amino-1,4-methano-1,2,3,4-tetrahydronaphthalene. Where $n$ is 2, the compound is 5,8-di-(hydroxy and/or hydrocarbyloxy)-6-amino-1,4-ethano-1,2,3,4-tetrahydronaphthalene.

Where $n$ is 1 and R, R' and R'' are hydrogen, the compound is 5,8-dihydroxy-6-amino-1,4-methano-1,2,3,4-tetrahydronaphthalene. Where R is hydrocarbyl, the compound is 5,8 - dihydroxy - 6 - hydrocarbylamino - 1,4-methano-1,2,3,4-tetrahydronaphthalene. In one embodiment, the hydrocarbyl is alkyl which may contain from 1 to 40 carbon atoms and preferably from 3 to 20 carbon atoms. Illustrative preferred compounds in this embodiment include 5,8-dihydroxy-6-isopropylamino-1,4-methano-1,2,3,4-tetrahydronaphthalene,
5,8-dihydroxy-6-sec-butylamino-1,4-methano-1,2,3,4-tetrahydronapthalene,
5,8-dihydroxy-6-sec-pentylamino-1,4-methano-1,2,3,4-tetrahydronapthalene,
5,8-dihydroxy-6-sec-hexylamino-1,4-methano-1,2,3,4-tetrahydronaphthalene,
5,8-dihydroxy-6-sec-heptylamino-1,4-methano-1,2,3,4-tetrahydronaphthalene,
5,8-dihydroxy-6-sec-octylamino-1,4-methano-1,2,3,4-tetrahydronaphthalene,
5,8-dihydroxy-6-sec-nonylamino1,4-methano-1,2,3,4-tetrahydronaphthalene,
5,8-dihydroxy-6-sec-decylamino-1,4-methano-1,2,3,4-tetrahydronaphthalene,
5,8-dihydroxy-6-sec-undecylamino-1,4-methano-1,2,3,4-tetrahydronaphthalene,
5,8-dihydroxy-6-sec-dodecylamino-1,4-methano-1,2,3,4-tetrahydronaphthalene,
5,8-dihydroxy-6-sec-tridecylamino-1,4-methano-1,2,3,4-tetrahydronaphthalene,
5,8-dihydroxy-6-sec-tetradecylamino-1,4-methano-1,2,3,4-tetrahydronaphthalene,
5,8-dihydroxy-6-sec-pentadecylamino-1,4-methano-1,2,3,4-tetrahydronaphthalene,
5,8-dihydroxy-6-sec-hexadecylamino-1,4-methano-1,2,3,4-tetrahydronaphthalene,
5,8-dihydroxy-6-sec-heptadecylamino-1,4-methano-1,2,3,4-tetrahydronaphthalene,
5,8-dihydroxy-6-sec-octadecylamino-1,4-methano-1,2,3,4-tetrahydronaphthalene,
5,8-dihydroxy-6-sec-nonadecylamino-1,4-methano-1,2,3,4-tetrahydronaphthalene,
5,8-dihydroxy-6-sec-eicosylamino-1,4-methano-1,2,3,4-tetrahydronaphthalene, etc.

Where R is aralkyl, it preferably is phenylalkyl containing from 1 to 3 alkyl groups of from 1 to 20 carbon atoms each. Illustrative compounds in this embodiment include 5,8-dihydroxy-6-benzylamino-1,4-methano-1,2,3,4-tetrahydronaphthalene,
5,8-dihydroxy-6-phenylethylamino-1,4-methano-1,2,3,4-tetrahydronaphthalene,
5,8-dihydroxy-6-phenylpropylamino-1,4-methano-1,2,3,4-tetrahydronaphthalene,
5,8-dihydroxy-6-phenylbutylamino-1,4-methano-1,2,3,4-tetrahydronaphthalene, etc.,
5,8-dihydroxy-6-(p-alkylbenzylamino)-1,4-methano-1,2,3,4-tetrahydronaphthalene,
5,8-dihydroxy-6-(p-alkylphenylethylamino)-1,4-methano-1,2,3,4-tetrahydronaphthalene,
5,8-dihydroxy-6-(p-alkylphenylpropylamino)-1,4-methano-1,2,3,4-tetrahydronaphthalene,
5,8-dihydroxy-6-(p-alkylphenylbutylamino)-1,4-methano-1,2,3,4-tetrahydronaphthalene, etc., in which the alkyl contains from 1 to 20 carbon atoms, and also including the corresponding o-alkyl, m-alkyl and the dialkl and trialkylphenylalkylamino derivatives.

Where R is aryl, an illustrative compound is 5,8-dihydroxy-6-phenylamino-1,4-methano-1,2,3,4-tetrahydronaphthalene and, where R is alkaryl, illustrative compounds include 5,8-dihydroxy-6-tolylamino-1,4-methano-1,2,3,4-tetrahydronaphthalene,
5,8-dihydroxy-6-xylylamino-1,4-methano-1,2,3,4-tetrahydronaphthalene,
5,8-dihydroxy-6-ethylphenylamino-1,4-methano-1,2,3,4-tetrahydronaphthalene,
5,8-dihydroxy-6-propylphenylamino-1,4-methano-1,2,3,4-tetrahydronaphthalene,
5,8-dihydroxy-6-butylphenylamino-1,4-methano-1,2,3,4-tetrahydronaphthalene, etc.

Where R is cycloalkyl, illustrative compounds include 5,8-dihydroxy-6-cyclobutylamino-1,4-methano-1,2,3,4-tetrahydronaphthalene,
5,8-dihydroxy-6-cyclopentylamino-1,4-methano-1,2,3,4-tetrahydronaphthalene,
5,8-dihydroxy-6-cyclohexylamino-1,4-methano-1,2,3,4-tetrahydronaphthalene,
5,8-dihydroxy-6-cycloheptylamino-1,4-methano-1,2,3,4-tetrahydronaphthalene,
5,8-dihydroxy-6-cyclooctylamino-1,4-methano-1,2,3,4-tetrahydronaphthalene,
5,8-dihydroxy-6-cyclononylamino-1,4-methano-1,2,3,4-tetrahydronaphthalene,
5,8-dihydroxy-6-cyclodecylamino-1,4-methano-1,2,3,4-tetrahydronaphthalene and
5,8-dihydroxy-6-cyclododecylamino-1,4-methano-1,2,3,4-tetrahydronaphthalene.

It is understood that the phenyl ring of the aralkyl, aryl, alkaryl and/or cycloalkyl groups may contain hydrocarbyl and particularly alkyl group or groups attached thereto. It is further understood that, while the aryl group peferably is phenyl, it may be naphthyl, anthracyl, etc. and this applies to the aralkyl, aryl, or alkaryl derivatives.

Where R' is hydrocarbyl, the novel compound is 5-hydroxy - 6 - amino - 8 - hydrocarbyloxy - 1,4 - methano-1,2,3,4-tetrahydronaphthalene or the corresponding 6-hydrocarbylamino derivatives. R' may contain from 1 to 40 carbon atoms, but preferably contains from 1 to 10 carbon atoms. The hydrocarbylamino group will be selected from those hereinbefore specifically set forth. Illustrative compounds in this embodiment include 5-hydroxy-6-isopropylamino-8-methoxy-1,4-methano-1,2,3,4-tetrahydronaphthalene,
5-hydroxy-6-sec-butylamino-8-methoxy-1,4-methano-1,2,3,4-tetrahydronaphthalene,
5-hydroxy-6-sec-pentylamino-8-methoxy-1,4-methano-1,2,3,4-tetrahydronaphthalene,
5-hydroxy-6-sec-hexylamino-8-methoxy-1,4-methano-1,2,3,4-tetrahydronaphthalene,
5-hydroxy-6-sec-heptylamino-8-methoxy-1,4-methano-1,2,3,4-tetrahydronaphthalene,
5-hydroxy-6-sec-octyl-amino-8-methoxy-1,4-methano-1,2,3,4-tetrahydronaphthalene, etc.,
5-hydroxy-6-isopropylamino-8-ethoxy-1,4-methano-1,2,3,4-tetrahydronaphthalene,
5-hydroxy-6-sec-butylamino-8-ethoxy-1,4-methano-1,2,3,4-tetrahydronaphthalene,
5-hydroxy-6-sec-pentylamino-8-ethoxy-1,4-methano-1,2,3,4-tetrahydronaphthalene,
5-hydroxy-6-sec-hexylamino-8-ethoxy-1,4-methano-1,2,3,4-tetrahydronaphthalene,
5-hydroxy-6-sec-heptylamino-8-ethoxy-1,4-methano-1,2,3,4-tetrahydronaphthalene,
5-hydroxy-6-sec-octylamino-8-ethoxy-1,4-methano-1,2,3,4-tetrahydronaphthalene, corresponding compounds in which the alkoxy group is propoxy, butoxy, pentoxy, hexoxy, heptoxy, octoxy, nonoxy, decoxy, etc., and corresponding compounds in which R is aralkyl, aryl, alkaryl or cycloalkyl and is selected from those hereinbefore set forth.

Where R" is hydrocarbyl and R' is hydrogen, the compound is a 5-hydrocarbyloy-6-amino-8-hydroxy-1,4-methano-1,2,3,4-tetrahydronaphthalene or corresponding compounds in which the amino substituent is a hydrocarbylamino and is selected from those hereinbefore set forth. Similarly, R" will be selected from the hydrocarbyl groups specifically set forth hereinbefore. Illustrative compounds in this embodiment include 5-methoxy-6-amino-8-hydroxy-1,4-methano-1,2,3,4-tetrahydronaphthalene,
5-methoxy-6-isopropylamino-8-hydroxy-1,4-methano-1,2,3,4-tetrahydronaphthalene,
5-methoxy-6-sec-butylamino-8-hydrory-1,4-methano-1,2,3,4-tetrahydronaphthalene, etc.,
5-ethoxy-6-amino-8-hydroxy-1,4-methano-1,2,3,4-tetrahydronaphthalene,
5-ethoxy-6-isopropylamino-8-hydroxy-1,4-methano-1,2,3,4-tetrahydronaphthalene,
5-ethoxy-6-sec-butylamino-8-hydroxy-1,4-methano-1,2,3,4-tetrahydronaphthalene, etc., and corresponding compounds in which the alkoxy group is propoxy, butoxy, pentoxy, hexoxy, heptoxy, octoxy or is aralkoxy, aryloxy, alkaryloxy or cycloalkoxy and is selected from those hereinbefore set forth.

Where R' and R" are hydrocarbyl, the compound is a 5,8-dihydrocarbyloxy-6-amino-1,4-methano-1,2,3,4-tetrahydronaphthalene or 5,8-dihydrocarbyloxy-6-hydrocarbylamino-1,4-methano-1,2,3,4-tetrahydronaphthalene, the hydrocarbyloxy and hydrocarbyl groups being selected from those hereinbefore set forth. Illustrative compounds in this embodiment include 5,8-dimethoxy-6-isopropylamino-1,4-methano-1,2,3,4-tetrahydronaphthalene,
5,8-dimethoxy-6-sec-butylamino-1,4-methano-1,2,3,4-tetrahydronaphthalene,
5,8-dimethoxy-6-sec-pentyl-1,4-methano-1,2,3,4-tetrahydronaphthalene,
5,8-dimethoxy-6-sec-hexyl-1,4-methano-1,2,3,4-tetrahydronaphthalene, etc.,
5,8-dimethoxy-6-benzylamino-1,4-methano-1,2,3,4-tetrahydronaphthalene,
5,8-dimethoxy-6-phenylamino-1,4-methano-1,2,3,4-tetrahydronaphthalene,
5,8-dimethoxy-6-tolylamino-1,4-methano-1,2,3,4-tetrahydronaphthalene,
5,8-dimethoxy-6-cyclohexylamino-1,4-methano 1,2,3,4-tetrahydronaphthalene, etc., corresponding compounds in which R' and R" are alkyl of 2 to 20 carbon atoms each or are selected from aralkyl, aryl, alkaryl or cycloalkyl as specifically hereinbefore set forth or mixtures thereof.

In the specific compounds hereinbefore set forth, the alkyl groups attached to the nitrogen are of secondary configuration. These are preferred generally but it is understood that the novel compounds of the present invention also include the normal alkyl derivatives. The preparation of the sec-alkyl as well as of the normal alkyl derivatives is described hereinafter.

Referring to the formula hereinbefore set forth, it is understood that the positions 1,2,3,4 and/or 7 may contain alkyl or other hydrocarbyl substituents attached thereto. Conveniently, these substituents result from the use of specific reactants in preparing the novel compounds of the present invention.

The specific compounds hereinbefore set forth are of the 1,4-methano species. It is understood that the 1,4-ethano species will correspond to the specific compounds hereinbefore set forth except for the ethano configuration instead of the methano configuration. Thus, illustrative compounds in this embodiment include 5,8-dihydroxy-6-amino-1,4-ethano-1,2,3,4-tetrahydronaphthalene,
5,8-dihydroxy-6-hydrocarbylamino-1,4-ethano-1,2,3,4-tetrahydronaphthalene,
5-hydroxy-6-amino-8-hydrocarbyloxy-1,4-ethano-1,2,3,4-tetrahydronaphthalene,
5-hydroxy-6-hydrocarbylamino-8-hydrocarbyloxy-1,4-ethano-1,2,3,4-tetrahydronaphthalene,
5-hydrocarbyloxy-6-amino-8-hydroxy-1,4-ethano-1,2,3,4-tetrahydronaphthalene,
5-hydrocarbyloxy-6-hydrocarbylamino-8-hydroxy-1,4-ethano-1,2,3,4-tetrahydronaphthalene,
5,8-dihydrocarbyloxy-6-amino-1,4-ethano-1,2,3,4-tetrahydronaphthalene,
5,8-dihydrocarbyloxy-6-hydrocarbylamino-1,4-ethano-1,2,3,4-tetrahydronaphthalene, in which R, R' and R" are selected from those specifically hereinbefore set forth. In the interest of brevity, specific compounds are not being repeated because they are already ascertainable from the hereinbefore description.

The compounds of the present invention may be prepared in any suitable manner. The 5,8-dihydroxy-1,4-methano-1,2,3,4-tetrahydronaphthalene for use as starting material may be prepared by the reaction of benzoquinone and cyclopentadiene according to the method of Diels-Alder, Ber. 62 2337 (1929). The yields of the desired compound from the above method are reported to be low. Accordingly, a preferred method is to start with cyclopentadienequinone, which compound was prepared in high yields by Wassermann, J. Chem. Soc., 1935, 1511. This compound then can be reacted with acetic anhydride in the presence of a catalytic amount of HCl or preferably HBr at room temperature to obtain 5,8-diacetoxy-1,4-methano-1,4-dihydronaphthalene in good yields. This reaction is reported by Vaughan and Yoshimine, J. Org. Chem., 22, 7 (1957). The diacetoxy derivative can be hydrolyzed, for example, in the presence of sodium hydroxide, to form the corresponding 5,8-dihydroxy derivative. This compound then is used as an intermediate in preparing the novel compounds of the present invention.

When $n$ in the above formula is 2,5,8-dihydroxy-1,4-ethano-1,4-dihydronaphthalene for use as starting material is prepared in any suitable manner. In one method it is prepared by the Diels-Alder reaction of cyclohexadiene with quinone. It is understood that any other suitable method of preparing this compound may be employed in accordance with the present invention.

The 5,8 - dihydroxy-1,4-methano-1,4-dihydronaphthalene or the 5,8-dihydroxy-1,4-ethano-1,4-dihydronaphthalene may be used as such for subsequent nitration and reductive alkylation or it first may be hydrogenated to the corresponding 1,2,3,4-tetrahydro derivative. When the mono- or dialkoxy derivative is desired, the dihydroxy derivative is reacted with a suitable etherification agent including, for example, dimethyl sulfate, diethyl sulfate, etc. This reaction readily is effected in the presence of a suitable base, such as sodium hydroxide, and with intimate stirring. The reaction mixture then is acidified, for example, with sulfuric acid, filtered, dried and extracted with hot benzene.

The dihydroxy, hydroxyalkoxy or dialkoxy-alkano-hydronaphthalene then is nitrated in any suitable manner to form the corresponding 6-nitro compound. The nitration is effected, for example, by the reaction of the alkano-dihydronaphthalene or alkantetrahydronaphthalene with nitric acid, preferably dissolved in acetic acid, and vigorously stirred. Following completion of the reaction, water is added to precipitate the product, which is recovered by filtration, and then may be water washed and recrystallized from methanol or otherwise.

As hereinbefore set forth, either before or after the nitration, the di-(hydroxy and/or hydrocarbyloxy)-alkano-dihydronaphthalene may be reduced to the tetrahydro derivative and this may be accomplished in any suitable manner, including reaction with hydrogen in the presence of nickel or other suitable hydrogenation catalyst. The nitro derivative similarly may be reduced to the amine by reaction with hydrogen in the presence of nickel or other suitable hydrogenation catalyst. The resulting 6-amino derivative is recovered or is converted to the hydrocarbylamino derivative in any suitable manner. In a particularly preferred method, this is accomplished by reductive alkylation of the amino nitrogen with an aldehyde or preferably with a ketone. For example, the isopropylamino derivative is prepared by reductive alkylation using acetone as the ketone, the sec-butylamino derivative by using methylethyl ketone, the cyclohexyl derivative by using cyclohexanone, etc. The normal alkyl derivative is prepared by using an aldehyde. The reductive alkylation is effected in any suitable manner and, in a preferred method, the reaction is effected in the presence of from 10 and preferably from 50 to 200 atmospheres of hydrogen at a temperature of from 120° to 250° C. and in the presence of a reductive alkylation catalyst. The reductive alkylation catalysts include those containing nickel, molybdenum, platinum, palladium, etc. A preferred catalyst comprises a composite of alumina and from 0.5 to 10% by weight of platinum, which catalyst may or may not contain from about 0.1 to 5% by weight of chlorine and/or fluorine.

In the preparation of the compounds of the present invention, a mixture of compounds may be formed. For example, a mixture containing at least 2 of the dihydroxy, hydroxyhydrocarbyloxy and dihydrocarbyloxy derivatives may be formed, and when desired, may be utilized as such without separation of the specific compounds.

The novel compounds of the present invention will have varied utility. In general, these compounds are useful as additives to retard deterioration of organic substrates which normally tend to deteriorate in storage, transportation and/or in use due to oxidation, ozonation, ultraviolet light absorption and/or other reactions.

In one embodiment, the compounds of the present invention are particularly useful in the stabilization of lubricants including lubricating oils and greases. These may be either synthetic or of petroleum origin. The synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl)-sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl)-azelate, di-3,5,5-trimethylhexyl glutarate, di-3,5,5-trimethylpentyl glutarate, di-(2-ethylhexyl)-pimelate, di-(2-ethylhexyl)-adepate, triamyl tricarballylate, pentaerythritol tetracaproate, pentaerythritol tetrapelargonate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, ethylphenyl silicone, etc. and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from 3 to 12 carbon atoms or more, and particularly neopentyl glycol propionate, neopentyl glycol butyrate, neopentyl glycol caproate, neopentyl glycol caprylate, neopentyl glycol pelargonate, etc., (2) trialkylo akane esters such as the esters of trimethyol alkanes including trimethylolethan, trimethylolpropane, trimethylolbutane, trimethylolpentane, trimethylolhexane, trimethylolheptane, trimethyloloctane, trimethylolnonane, trimethyloldecane, trimethylolundecane, trimethyloldodecane, etc., and particularly triesters in which the ester portions each contain from 3 to 12 carbon atoms and may be selected from those hereinbefore specifically set forth in connection with the discussion of the neopentyl glycol esters, and (3) tricresylphosphate, triphenylphosphate, tricoctyphosphate, trinonylphosphate, tridecylphosphate, as well as mixed aryl and alkyl phosphates, etc.

The lubricating oils of petroleum origin include those referred to as motor lubricating oil, railroad type lubricating oil, marine oil, transformer oil, turbine oil, transmission oil, differential oil, diesel lubricating oil, gear oil, cutting oil, rolling oil, cylinder oil, hydraulic oil, slushing oil, specialty products oil, etc.

The synthetic greases generally are referred to as lithium base grease, sodium base grease, calcium base grease, barium base grease, strontium base grease, aluminum base grease, etc. These greases are solid or semisolid gels and, in general, are prepared by the addition to mineral and/or synthetic oil of hydrocarbon-soluble metal soaps or salts of higher fatty acids as, for example lithium stearate, calcium stearate, aluminum naphthenate, etc. The grease may contain thickening agents such as silica, carbon black, polyacrylates, talc, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

In another embodiment, the novel compounds of the present invention are useful in the stabilization of polyolefins including polyethylene, polypropylene, polybutylene, copolymers of ethylene and propylene, copolymers of ethylene and butylene and copolymers of propylene and butylene, as well as polymers prepared from one or more higher molecular weight olefins. The polyolefins preferably are of high molecular weight, usually having a molecular weight above 1000 and extending into the hundreds of thousand range. The polyolefins may be of the high density, medium density or low density type. Polyethylene is utilized, for example, as a thermoplastic molding or coating agent. Because of its high dielectric strength and its resistance to water, polyethylene is particularly advantageous for use as insulators or dielectrics in condensers and other similar electronic equipment. Polyethylene plastics also are used in many other applications. Polypropylene, polybutylene and copolymers of ethylene, propylene and/or butylene also are used in electronic equipment, as well as many other applications. When the polyolefins are used in outdoor exposure as, for example, in light weight outdoor furniture, cover for greenhouses, awnings, etc., it is additionally desirable that the polyolefin does not undergo discoloration. The polyolefins also are subject to attack by atmospheric oxygen which impairs the desirable properties thereof.

In another embodiment, the compounds of the present invention may be useful in the stabilization of fatty materials including the stabilization of edible fats and oils, which may be of animal, vegetable or mineral origin and which tend to become rancid, especially during long periods of storage prior to use. Typical representatives of edible fats and oils include linseed oil, menhaden oil, cod liver oil, caster oil, olive oil, rapeseed oil, coconut oil, palm oil, corn oil, sesame oil, peanut oil, butter, fat, lard, beef, etc. It is understood that other oils and fats may be treated within the scope of the present invention, including oils and fats which previously have been subjected to various treatments, such as blowing with air, heat treatment, hydrogenation, etc.

In still another embodiment, the compounds may be used in the treatment of crops by dusting or spraying in order to preserve food accessory factors such as carotene, vitamins, various fatty acids, alcohols, etc.

Other organic substances which deteriorate in storage, during treatment and/or in use, include hydrocarbons and particularly motor fuels such as saturated and particularly unsaturated gasoline, blends of unsaturated and saturated gasolines, including cracked gasoline, straight run gasoline, polymer gasoline, coker gasoline, alkylate, etc., as well as jet fuel, diesel oil, mineral oil, fuel oil, residual oil, drying oil waxes, resins, rubber which may be natural or synthetic, etc. These substances are adversely affected by oxygen, with the resultant formation of undesirable gum, discoloration and/or other deleterious reaction products.

When used as additives in organic substrates, the compounds of the present invention may be used in a concentration of from about 0.001% to about 20% and more particularly from about 0.001% to about 1% by weight of the organic substrate. The exact concentration to be used will depend upon the particular organic substrate being stabilized.

It is understood that the compound of the present invention may be used along with other additives incorporated in the organic substance. For example, in grease it may be used along with higher alcohols, esters, organic amines, polybutene, sulfurized fatty materials, sulfur chlorine compounds, molybdenum disulfide, dyes, perfumed materials, fillers, etc. In lubricating oil, it may be used along with one or more of the above additives and/or viscosity index improver, pourpoint depressor, antifoaming agent, detergent, lubricity or extreme pressure additive, etc. In polymers, such as polyolefins, the compound is used along with one or more of dyes and/or pigments, anti-static agents, plasticizers, other antioxidants or ultraviolet light stabilizers, etc. In some cases, it may be of advantage to also include a metal deactivator as, for example, disalicylal diamino propane, ethylene diamine tetraacetic acid tetrasodium salt, etc., or to include other additives such as tricresyl phosphate, trialkyl phenols including 2,6-di-tert-butyl-4-methylphenol, 2,4-dimethyl-6-tert-butylphenol, alkylated diphenyl amines, phenyl naphthyl amines, dialkyl phenylene diamines, phenothiazine, organic selenium compounds, etc. When desired the compound of the present invention may be prepared as a mixture with one or more of these other additives and incorporated in this manner in the organic substance.

Also, it is understood that the compound of the present invention may be prepared as a solution in a suitable solvent including hydrocarbons, alcohols, ketones, etc. In some cases, the same solvent used for the compound of the present invention may be used for one or more of the other additives to be incorporated in the organic substance. In another method, the compound of the present invention may be prepared as a stock solution in a small quantity of the organic substance and the stock solution then is incorporated into the major quantity of the organic substance.

The compound of the present invention may be incorporated in the organic substance in any suitable manner and at any suitable stage of preparation. For example, in an organic substance which comprises a mixture of several components as, for example, grease, the compound may be added to one or more of the components of the grease prior to compositing and processing thereof, or it may be added to the mix at any time, preferably before final processing in order to obtain intimate mixing and dissolving of the compound in the grease.

The following examples are introduced to illustrate further the novelty and utility of the present invention, but not with the intention of unduly limiting the same.

EXAMPLE 1

This example describes the preparation of 5,8-diethoxy-6-isopropylamino-1,4-methano - 1,2,3,4 - tetrahydronaphthalene. It was prepared as follows. For use as a starting material, 5,8-diacetoxy-1,4-methano-1,4-dihydronaphthalene was prepared by dissolving 50 g. of cyclopentadienequinone in 50 cc. of glacial acetic acid and 88 g. of acetic anhydride. The mixture was stirred vigorously and 1.5 ml. of 48% aqueous HBr was added thereto. Stirring was continued for 1 hour and the mixture was allowed to stand overnight. The mixture then was cooled and water was added until the product crystallized. The solid was filtered off and more water was added to recover a second crop of crystals. The solid was recrystallized from hexane to recover 5,8-diacetoxy-1,4-methano-1,4-dihydronaphthalene, having a melting point of 105–106° C. This compound then was reduced to the tetrahydro derivative by suspending 120 g. thereof in 300 cc. in methanol and reducing at 75° C. under 100 atmospheres of hydrogen in the presence of 10 g. of nickel catalyst. The hot solution was filtered to remove the catalyst, cooled, the solid product filtered off and recrystallized from methanol. 5,8-diacetoxy-1,4-methano-1,2,3,4-tetrahydronaphthalene was recovered as a solid having a melting point of 116–117° C. Upon analysis the product was found to contain 69.38% carbon and 5.91% hydrogen which corresponds to the theoretical of 69.22% carbon and 6.20% hydrogen.

The 5,8-diacetoxy-1,4-methano - 1,2,3,4 - tetrahydronaphthalene was hydrolyzed to the corresponding dihydroxy compound by dissolving 150 g. of the diacetoxy derivative in 1.5 liters of 10% sodium hydroxide solution and refluxing the mixture under nitrogen atmosphere until all of the solid material went into solution. The solution then was cooled, acidified with dilute HCl, filtered and dried. 5,8-dihydroxy-1,4-methano-1,2,3,4-tetrahydronaphthalene was recovered by recrystallizing from xylene and was found to have a melting point of 178–179° C.

The 5,8-dihydroxy derivative prepared in the above manner was converted to the diethoxy derivative by adding 220 g. of diethyl sulfate to a stirred solution of 125 g.

of the dihydroxy derivative and 580 g. of 10% sodium hydroxide, while maintaining the temperature at 30–35° C. Thereafter the mixture was heated to reflux for one hour and then cooled to room temperature. The product was extracted with pentane, washed with water, the solvent evaporated, and 5,8-diethoxy-1,4-methano-1,2,3,4-tetrahydronaphthalene was recovered by distillation, the product having a boiling point of 92° C. at 0.15 mm. Hg and a melting point of 54.55° C.

The 5,8 - diethoxy - 1,4 - methano - 1,2,3,4 - tetrahydronaphthalene, prepared in the above manner, was nitrated by dissolving 92 g. thereof in 200 cc. of acetic acid and 50 cc. of chloroform, cooling to 15° C. and adding dropwise with stirring 36 g. of 70% nitric acid dissolved in 25 cc. of acetic acid. After standing for one hour, the mixture was poured into 2 liters of water and extracted with pentane. The solvent was removed by evaporation and the nitro derivative was recovered by distillation. The nitro derivative was recrystallized from methanol and recovered as a solid having a melting point of 49–51° C. Analysis showed 64.83% carbon and 6.96% hydrogen which corresponds to the theoretical of 64.97% carbon and 6.91% hydrogen.

The 5,8 - diethoxy - 6 - nitro - 1,4 - methano - 1,2,3,4-tetrahydronaphthalene, prepared in the above manner, was converted to the corresponding amine by dissolving 95 g. of the nitro derivative in 400 cc. of ethyl acetate and reducing at 100° C. under 100 atmospheres of hydrogen in the presence of 5 g. of nickel catalyst. After completion of the reaction, the catalyst was removed by filtering, the solvent was removed by evaporation and 5,8 - diethoxy - 6 - amino - 1,4 - methano - 1,2,3,4 - tetrahydronaphthalene was recovered by recrystallization from methanol as a solid having a melting point of 96–98° C. Analysis showed 72.93% carbon and 8.54% carbon and 8.56% hydrogen.

The 5,8 - diethoxy - 6 - 1,4 - methano - 1,2,3,4 - tetrahydronaphthalene, prepared in the above manner, was subjected to reductive alkylation by reacting 40 g. of the amino derivative dissolved in 500 cc. of acetone at 160° C. under 100 atmospheres of hydrogen in the presence of 20 g. of alumina-platinum catalyst. After completion of the reaction, the catalyst was removed by filtering, the excess acetone was removed by evaporation and 5,8 - diethoxy - 6 - isopropylamino - 1,4 - methano-1,2,3,4-tetrahydronaphthalene was recovered by recrystallization from methanol as a solid having a melting point of 40–42° C. Analysis found 74.82% carbon and 9.34% hydrogen which corresponds to the theoretical of 74.70% carbon and 9.40% hydrogen.

EXAMPLE II

The compound of this example is 5,8 - dimethoxy-6-sec-butylamino - 1,4 - methano - 1,2,3,4 - tetrahydronaphthalene and is prepared in substantially the same manner as described in Example I, except that dimethyl sulfate is reacted with the 5,8-dihydroxy-1,4-methano-1,2,3,4-tetrahydronaphthalene, then is nitrated, reduced and reductively alkylated with methyl ethyl ketone. The reductive alkylation product is worked up in the same manner as hereinbefore set forth and the 5,8-dimethoxy-6 - sec - butylamino - 1,4 - methano - 1,2,3,4 - tetrahydronaphthalene is recovered by recrystallization from methanol.

EXAMPLE III

The compound of this example is 5,8-dimethoxy-6-cyclohexylamino - 1,4 - methano - 1,2,3,4 - tetrahydronaphthalene and is prepared in substantially the same manner as described in Example I except that cyclohexanone is used as the ketone in the reductive alkylation. Accordingly, 5,8 - dimethoxy-6-amino-1,4-methano-1,2,3,4-tetrahydronaphthalene is subjected to reductive alkylation at 160° C. with cyclohexanone under 100 atmospheres of hydrogen in the presence of alumina-platinum catalyst.

EXAMPLE IV

The compound of this example is 5,8-dihydroxy-6-isopropylamino - 1,4 - methano - 1,2,3,4-tetrahydronaphthalene and is prepared in substantially the same manner as hereinbefore set forth by nitrating 5,8-dihydroxy-1,4-methano-1,2,3,4 - tetrahydronaphthalene, reducing the resulting nitro derivative and subjecting the resulting amino derivative to reductive alkylation with acetone in the manner hereinbefore set forth.

EXAMPLE V

The compound of this example is 5,8-dihydroxy-6-isopropylamino - 1,4 - ethano - 1,2,3,4 - tetrahydronaphthalene and is prepared as follows. Initially, 5,8-dihydroxy-1,4 - ethano - 1,4 - dihydronaphthalene is prepared by the Diels-Alder reaction of cyclohexadiene with quinone. This compound then is reduced to the corresponding 1,2,3,4-tetrahydronaphthalene derivative by reacting at 75° C. under 100 atmospheres of hydrogen in the presence of nickel catalyst. The resulting product is nitrated with nitric acid dissolved in glacial acetic acid and then reduced to the amine by hydrogenation at 60° C. under 100 atmospheres of hydrogen in the presence of nickel catalyst. The resulting amino derivative then is subject to reductive alkylation with acetone at 160° C. under 100 atmospheres of hydrogen in the presence of alumina-platinum catalyst to prepare 5,8 - dihydroxy - 6 - isopropylamino-1,4-ethano-1,2,3,4-tetrahydronaphthalene.

EXAMPLE VI

The compound of this example is 5-hydroxy-6-cyclohexylamino - 8 - methoxy - 1,4 - ethano - 1,2,3,4 - tetrahydronaphthalene and is prepared by methylating 5,8-dihydroxy - 1,4 - methano - 1,2,3,4 - tetrahydronaphthalene with dimethyl sulfate. The monoether is separated from the etherification products and then is nitrated, reduced and subjected to reductive alkylation with cyclohexanone in the same manner as hereinbefore set forth.

EXAMPLE VII

The compound of this example is 5,8-dimethoxy-6-isopropyl-amino - 1,4 - ethano-1,2,3,4 - tetrahydronaphthalene and is prepared by first forming the diether in substantially the same manner as described in Example VI, except that the diether is separated from the effluent products and further processed. The diether is nitrated, reduced and subjected to reductive alkylation using acetone as the ketone in substantially the same maner as hereinbefore set forth.

EXAMPLE VIII

This example illustrates the use of a compound of the present invention as an additive in synthetic lubricating oil. The synthetic lubricating oil used in this example is dioctyl sebacate marketed under the trade name of "Plexol 201."

The lubricating oil was evaluated in accordance with a standard oxygen stability test, in which a 100 cc. sample of the lubricating oil is placed in a bath maintained at 204° C. and air is blown therethrough at a rate of 5 liters of air per hour. The sample of lubricating oil is examined periodically and the time to reach an acid number of 5 is reported. It is apparent that the longer the time required to reach an acid number of 5, the more stable is the sample of lubricating oil. In other words, it takes longer for the more stable oil to deteriorate.

The sample of the dioctyl sebacate without additive, when evaluated in the oxygen stability test described above, develops an acid number of 5 within 9 hours. In contrast, another sample of the dioctyl sebacate containing 1% by weight of 5,8-diethoxy-6-isopropylamino-1,4-methano-1,2,3,4-tetrahydronaphthalene, prepared as described in Example I, did not reach an acid number of 5 until 13 hours. It is of particular interest to note that,

11 after oxidation in the above manner, the tube was clean and free of deposits.

EXAMPLE IX

This example illustrates the use of a compound of the present invention for the stabilization of polyethylene. The polyethylene used in this example is of high density and is marketed under the trade name of "Fortiflex." In the sample containing additive, the additive is used in a concentration of 0.075% by weight of the polyethylene and is incorporated therein by milling. The samples of polyethylene are evaluated in a method similar to that described by Hawkins, Hansen, Matreyek and Winslow in Rubber Chemistry and Technology, October-November 1959, pages 1164–1170, except that an electrically heated aluminum block rather than an oven is used to maintain the desired temperature. The oxygen absorption of the sample is determined manometrically rather than volumetrically. In this method, samples of the polyethylene weighing about 0.5 g. are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to individual manometers containing mercury and the differential pressure is periodically determined. The induction period is taken as the number of hours required to reach a pressure differential of 20 cm. Hg.

A sample of the polyethylene without additive reaches the induction period within 7.5 hours. In contrast, a sample of the polyethylene containing 0.075% by weight of 5,8 - dimethoxy - 6 - cyclohexylamine - 1,4 - methano-1,2,3,4-tetrahydronaphthalene, prepared as described in Example III, has a considerably longer induction period.

EXAMPLE X

This example illustrates the use of a different compound of the present invention in another sample of the polyethylene described in Example IX. The compound used in this example is 5,8-dihydroxy-6-isopropylamino-1,4-ethano-1,2,3,4-tetrahydronaphthalene, prepared as described in Example V, and is incorporated in another sample of the polyethylene in a concentration of 0.1% by weight and evaluated in the same way as described in Example X. The additive serves to prolong the induction period of the polyethylene.

EXAMPLE XI

This example illustrates the use of the compound of the present invention as an additive in rubber. The compound used in this example is 5-hydroxy-6-cyclohexylamino - 8 - methoxy - 1,4 - ethano - 1,2,3,4 - tetrahydronaphthalene and is incorporated in a concentration of 3% by weight into butadiene-styrene rubber during milling thereof. This serves to retard deterioration of rubber during storage and use.

EXAMPLE XII

This example illustrates the use of the compound of the present invention in gasoline. The gasoline used in this example is a caustic washed, thermally cracked gasoline. To this gasoline is added 0.02% by weight of 5,8 - dimethoxy - 6 - sec-butylamino - 1,4 - methano-1,2,3,4-tetrahydronaphthalene, prepared as described in Example II, and this serves to considerably prolong the induction period of the gasoline.

I claim as my invention:

1. A compound of the following formula

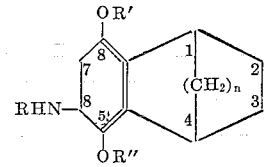

where R is hydrogen or hydrocarbyl selected from the group consisting of sec-alkyl of 3 to about 20 carbon atoms, aralkyl of 7 to 10 carbon atoms, alkaryl of 7 to 10 carbon atoms, phenyl, naphthyl, anthracyl and cycloalkyl of 4 to 12 carbon atoms; R' and R" are independently selected from the group consisting of hydrogen and alkyl of 1 to 10 carbon atoms; and $n$ is 1 or 2.

2. The compound of claim 1 being a 5,8-dihydroxy-6-hydrocarbylamino - 1,4 - methano - 1,2,3,4 - tetrahydronaphthalene, the hydrocarbyl group being as defined in claim 1.

3. The compound of claim 2 wherein said hydrocarbyl is sec-alkyl of 3 to about 20 carbon atoms.

4. The compound of claim 1 being a 5,8-dihydroxy-6-hydrocarbylamino - 1,4 - ethano - 1,2,3,4 - tetrahydronaphthalene, the hydrocarbyl group being as defined in claim 1.

5. The compound of claim 4 wherein said hydrocarbyl is sec-alkyl of 3 to about 20 carbon atoms.

6. The compound of claim 1 being 5,8-dialkoxy-6-hydrocarbylamino - 1,4 - methano - 1,2,3,4 - tetrahydronaphthalene in which each alkoxy contains from 1 to about 10 carbon atoms, the hydrocarbyl group being as defined in claim 1.

7. The compound of claim 6 wherein said hydrocarbyl is sec-alkyl of from 3 to about 20 carbon atoms.

8. The compound of claim 6 in which said hydrocarbyl is cyclohexyl.

No references cited.

ROBERT V. HINES, Primary Examiner

U.S. Cl. X.R.

44—72; 99—163; 252—51.5, 63, 403; 260—45.9, 398.5, 479, 570.8, 570.9, 612, 619, 621, 622, 809